United States Patent [19]

Nishimura et al.

[11] Patent Number: 4,562,731
[45] Date of Patent: Jan. 7, 1986

[54] AIR FLOW METER

[75] Inventors: Yutaka Nishimura, Katsuta; Hiroshi Kuroiwa; Tadashi Kirisawa, both of Hitachi; Yoshishige Ōyama, Katsuta, all of Japan

[73] Assignee: Hitachi, Ltd., Tokyo, Japan

[21] Appl. No.: 438,773

[22] Filed: Nov. 3, 1982

Related U.S. Application Data

[63] Continuation of Ser. No. 168,736, Jul. 14, 1980, Pat. No. 4,373,387.

[30] Foreign Application Priority Data

Jul. 24, 1979 [JP] Japan .................. 54-94725

[51] Int. Cl.⁴ .................. G01F 5/00; G01F 1/68
[52] U.S. Cl. .................. 73/202; 73/118; 73/204
[58] Field of Search .............. 73/118 A, 202, 204

[56] References Cited

U.S. PATENT DOCUMENTS

| 3,363,462 | 1/1968 | Sabin ................. 73/204 |
| 3,747,577 | 7/1973 | Mauch et al. ......... 73/202 X |
| 3,975,951 | 8/1976 | Kohama et al. ........ 73/204 X |
| 4,297,881 | 11/1981 | Sasayama et al. ..... 73/204 |

FOREIGN PATENT DOCUMENTS

| 2227067 | 1/1973 | Fed. Rep. of Germany ........ 73/204 |
| 1397113 | 6/1975 | United Kingdom . |
| 0591774 | 2/1978 | U.S.S.R. ................. 73/204 |

Primary Examiner—Charles A. Ruehl
Attorney, Agent, or Firm—Antonelli, Terry & Wands

[57] ABSTRACT

An air flow meter comprises an air velocity measuring resistor and a temperature compensating resistor and is installed in a bypass passage provided at an intake passage running through an air horn. The air velocity measuring resistor and the temperature compensating resistor are supported by lead wires whose portions exposed in the bypass passage have the same length. A cover forming the bypass passage is made of heat insulating synthetic resin material to prevent heats from being transmitted to the resistors.

4 Claims, 24 Drawing Figures

AIR FLOW METER

This is a continuation of application Ser. No. 168,736 filed July 14, 1980, now U.S. Pat. No. 4,373,387.

BACKGROUND OF THE INVENTION

This invention relates to an intake air flow meter for internal combustion engines of automobiles and particularly to a heat sensing wire type air flow meter.

There are various methods of measuring the volume of the intake air drawn into an internal combustion engine. Among these, the heat sensing wire type air flow meter is most widely used since it has a good response and is capable of measuring the mass of air drawn in so that pressure correction is not necessary. This kind of air flow meter comprises a platinum wire of 70 to 100 µm in diameter which is strained in the air horn as proposed in the patent application of Japanese Patent Publication No. 48893/1974 (U.S. Pat. No. 3747577), the Laid-Open No. 19227/1972 and the Laid-Open No. 64134/1976. The flow meters in these applications, however, have a problem of durability and especially have other problems that the detecting portion is likely to be damaged by backfiring caused when the engine is not running in good condition.

In order to solve these problems, an improved air flow meter has been proposed in which the detecting portion is comprised by winding a platinum wire on a supporting body such as hollow body made of ceramic material and having a coating material thereon, whereby the air flow meter has improved mechanical strength (Japanese Patent Application Nos. 53-42547 and 53-65748).

The detecting portion above, however, is likely to be affected by heat transmitted from a member supporting the detecting portion, since the ratio of length to diameter of the platinum wire of which the detecting portion is comprised, is comparatively small and the detecting portion is supported by lead wires whose portions exposed in an air flow passage are not small enough in diameter to prevent heat from being transmitted.

Accordingly, the output signal of the air flow meter is affected by the wall temperature of the air horn.

SUMMARY OF THE INVENION

One object of the invention is to provide an air flow meter which is capable of measuring with high accuracy the volume of air drawn in under any running condition of the engine.

Another object of the invention is to provide an air flow meter which is capable of measuring with high accuracy the volume of air drawn in without the influence of the wall temperature under any running condition of the engine.

Still another object of the invention is to provide an air flow meter which provides an improved proportional relationship between the main intake air mass and the bypass air mass under any running condition of the engine.

A feature according to one embodiment of the invention is that the lead wire supporting the temperature compensating resistor has the same length as that supporting the air velocity measuring resistor or is longer than that supporting the air velocity measuring resistor.

A feature according to another embodiment of the invention is that the air flow meter is installed in the bypass passage having a flat rectangular cross section, the internal surface of which is formed of heat insulating material.

A feature according to still another embodiment of the invention is that the air flow meter is controlled by a constant voltage circuit in which a suitably adjusted constant voltage is added to the potential difference between two intermediate points of a bridge circuit incorporating the heat sensing resistors.

According to the present invention the volume of air drawn in is measured with high accuracy under any running condition of the engine.

According to one embodiment of the invention the influence of the wall temperature is reduced whereby the volume of air drawn in is measured with high accuracy under any running condition of the engine.

According to another embodiment of the invention the proportional relationship between the main intake air mass and the bypass air mass is improved whereby the volume of air drawn in is measured with high accuracy under any running condition of the engine.

DETAILED DESCRIPTION OF THE PREFERRED EMBODIMENT

Figure 1:
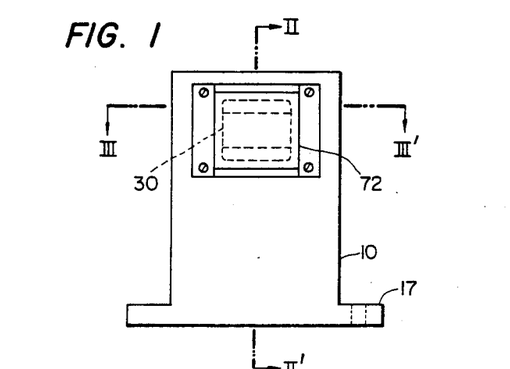
FIG. 1 is a front view of an air horn employing an embodiment of the air flow meter of the invention.
Figure 2:
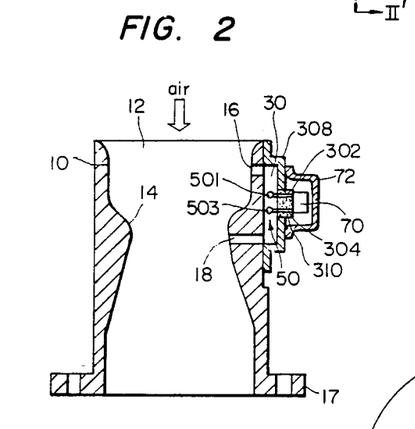
FIG. 2 is a cross-sectional view taken along the line II—II' of FIG. 1.
Figure 3:
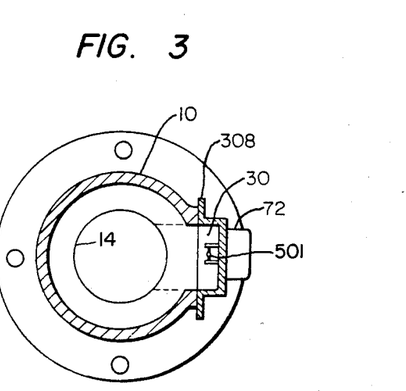
FIG. 3 is a cross-sectional view taken along the line III—III' of FIG. 1.

Referring to FIGS. 1, 2 and 3, an air horn 10 has an intake passage 12 running therethrough, in which a venturi 14 is formed. The flange 17 at the lower end of the air horn 10 is connected with a throttle valve chamber (not shown). Provided downstream of the throttle valve in the throttle valve chamber is a fuel injection valve (not shown). Air drawn in as indicated by the arrow in FIG. 2 passes through the venturi 14, and a part of it also passes through a bypass passage 30. The air that has entered bypass inlet 16 located upstream of the venturi 14 is drawn through the bypass passage 30 to a bypass outlet 18 located at the venturi 14 by the vacuum developed at the bypass outlet 18, from which the air comes out into the intake passage 12.

An air flow meter 50 according to one embodiment of the invention shown in FIG. 2 is installed in the bypass passage 30 and may be installed in the intake passage 12.

The air flow meter 50 according to the invention comprises an air velocity measuring resistor 501, a temperature compensating resistor 503, lead wires 302, 304 for supporting the resistors 501, 503 thereon respectively and supplying electric power therethrough, and an electronic circuit 70 for controlling the resistors 501 and 503.

Figure 4A:
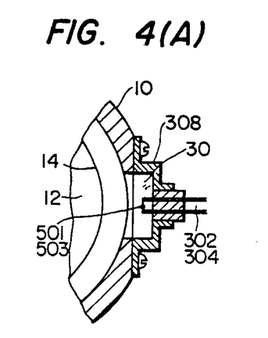
FIGS. 4(A)–4(C) are cross-sectional views showing how the sensing elements are mounted in the bypass passage.
Figure 4B:
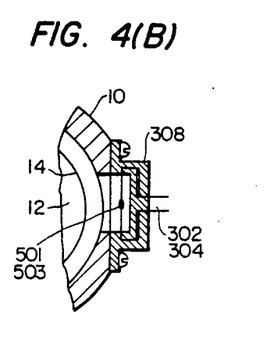
Figure 4C:
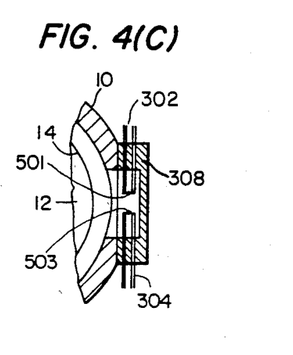

The air velocity measuring resistor 501 is arranged above the temperature compensating resistor 503 as shown in FIG. 2, and FIG. 4(A) and 4(B), however, the two resistors 501, 503 may be arranged side by side as shown in FIG. 4(C).

The lead wires 302 and 304 extend through a supporting member 310 arranged in a cover 308 and are connected to the electronic circuit 70 which is protected by a circuit cover 72 and will be described in detail hereinafter.

The cover 308 forming the bypass passage 30 is made of heat insulating material such as synthetic resin or plastic to insulate the bypass passage 30 from external temperature influences and improve the electrical insulation of the heat sensing resistors 501 and 503.

Figure 5A:
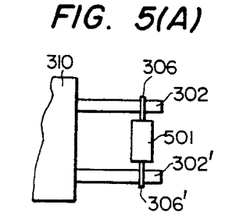
FIGS. 5(A)–5(C) are views showing how the air flow meter of the invention is supported by lead wires.
Figure 5B:
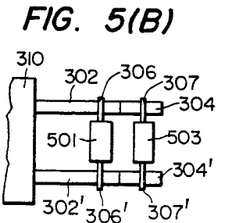

Each resistor 501 and 503 installed in the bypass passage 30 is provided with connecting lead wires 306, 306' and 307, 307' at the opposite ends thereof and is supported through these connecting lead wires 306, 306' and 307, 307' by the lead wires 302, 302' and 304, 304' whose portions exposed in the bypass passage 30 have the same length as shown in FIGS. 5(A) and (B).

The current supplied through the lead wires 302 and 304 heats the air velocity measuring resistor 501 to a predetermined temperature but the temperature compensating resistor 503 is heated only to a temperature slightly higher than the atmospheric temperature.

For example, the temperature of the air velocity measuring resistor 501 is about 100° to 200° C. higher than that of the air drawn in, and the temperature of the temperature compensating resistor 503 is almost equal to that of the air drawn in.

When the temperature of the air flowing through the bypass passage 30 is different from that of the cover 308, heat flows through the lead wires 302 and 304 to change the temperature of the resistors 501 and 503.

That is, when the temperature of the cover 308 is higher than that of the air flowing through, the heats are transmitted from the cover 308 through the lead wires 302 and 304 to the resistors 501 and 503, especially to the temperature compensating resistor 503.

To the contrary, when the temperature of the cover 308 is almost equal to or lower than that of the air flowing through, the heat is transmitted from the resistors 501 and 503 through the lead wires 302 and 304 to the cover 308.

The temperature difference between the air flowing through and the cover 308 decreases in accordance with the increase of the volume of air flowing through since an active heat exchange is carried out between the air flowing through and the cover 308.

In general, the heat resistance of the lead wire is directly proportional to the length and inversely proportional to the cross-sectional area thereof.

Accordingly, the heat exchanged between the cover 308 and the resistors 501 and 503 can be made small by making the heat resistance of the lead wires 302 and 304 large, i.e., by making the lead wires long and/or small in diameter.

The results of an experiment carried out by the inventors are shown in FIGS. 6(A)–8(B), according to which the influence of the wall temperature to the output signal can be understood, when the relative length of the lead wires 302 and 304 supporting the resistors 501 and 503 changes under the condition of the constant air mass flow of 0.1 m$^3$/min. and 1 m$^3$/min.

In FIGS. 6(A)–8(B), the abscissa represents wall temperature (° C.) and the ordinate represents output signal (in volts) of the air flow meter of the invention.

Figure 5C:
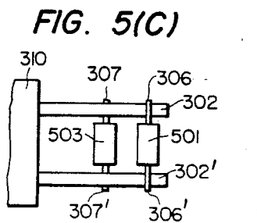
Figure 5D:
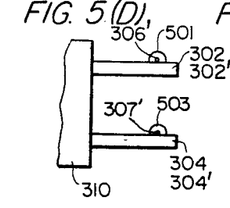
Figure 6A:
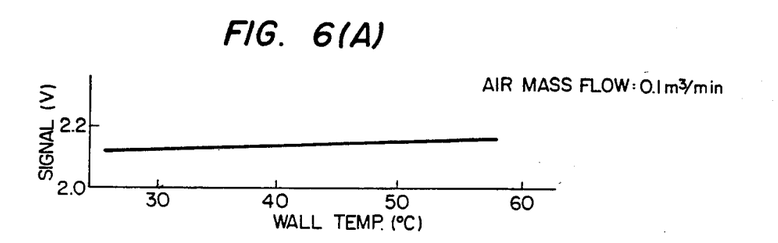
FIGS. 6(A), 6(B), 7(A), 7(B), 8(A) and 8(B) are diagrams showing the relation of the output signal of the air flow meter of the invention to the wall temperature under the constant air mass flow.
Figure 6B:
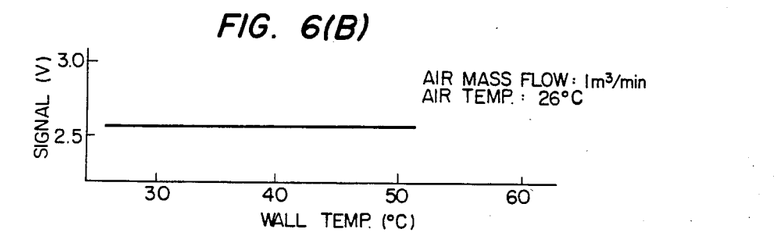

In the case where the lead wires 302 and 304 whose portions exposed in the bypass passage 30 have the same length as shown in FIG. 5(A) and 5(D) hardly any influence of the wall temperature to the output signal is expected at the constant air mass flow of 1 m$^3$/min. as shown in FIG. 6(B). For a constant flow mass rate of 0.1 m$^3$/min., there is a slight increase with temperature, as shown in FIG. 6(A).

Figure 5E:
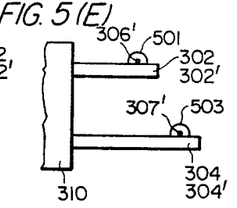
Figure 7A:
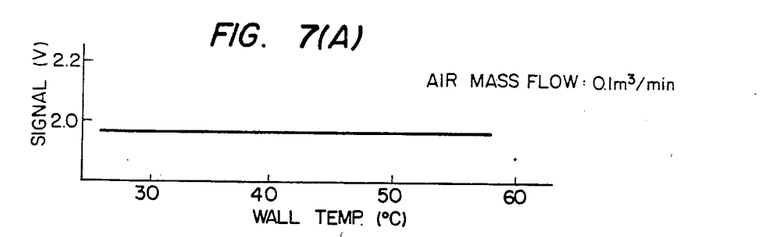
Figure 7B:
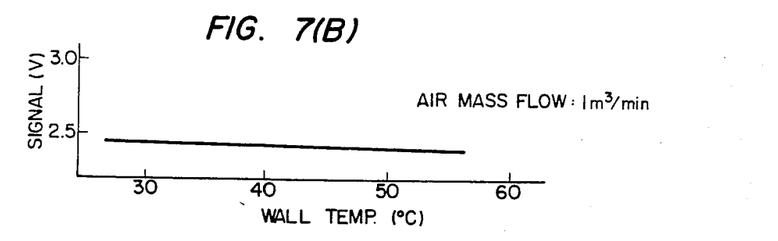

In the case where the lead wire 304 supporting the temperature compensating resistor 503 is longer than that supporting the air velocity measuring resistor 501 as shown in FIGS. 5(B) and 5(E), hardly any influence of the wall temperature to the output signal is expected at the constant air mass flow of 0.1 m$^3$/min. and 1 m$^3$/min., as shown in FIGS. 7(A) and 7(B), respectively, and especially the output signal slightly decreases at the constant air mass flow of 1 m$^3$/min. in accordance with the increase of the wall temperature, as shown in FIG. 7(B).

Figure 5F:
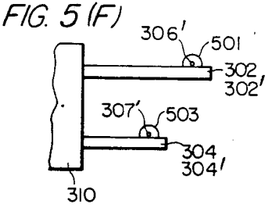
Figure 8A:
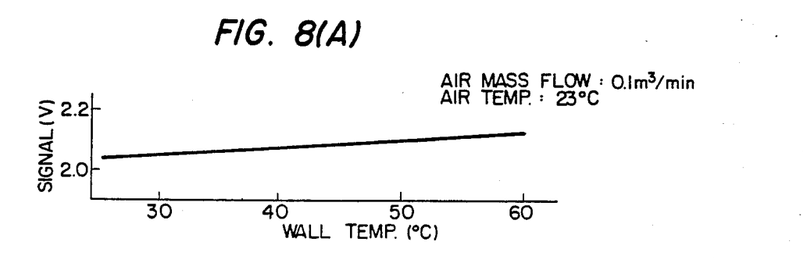
Figure 8B:
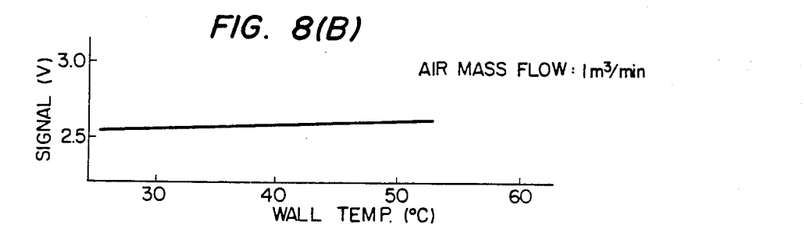

In the case where the lead wire 302 supporting the air velocity measuring resistor 501 is longer than that supporting the temperature compensating resistor 503 as shown in FIGS. 5(C) and 5(F), the output signal increases in accordance with the increase of the wall temperature at the respective constant air mass flows of 0.1 m$^3$/min and 1 m$^3$/min, as shown in FIG. 8(A) and 8(B).

As is apparent from the above, the temperature compensating resistor 503 is likely to be affected by heat transmitted thereto from the cover 308 or by heat transmitted therefrom to the cover 308.

In the case of a large amount of air flowing through passage 30, it is preferable to make the lead wire 304 supporting the temperature compensating resistor 503 longer than or equal to that supporting the air velocity measuring resistor 501 as shown in FIGS. 5(A), 5(D) and 5(B), 5(E), the reason for which can be understood by referring to FIGS. 6(B) and 7(B).

In the case of relatively small amount of air flowing through, it is preferable to make the lead wire 304 supporting the temperature compensating resistor 503 longer than that supporting the air velocity measuring resistor 501 as shown in FIGS. 5(B) and 5(E), the reason for which is understood by FIG. 7(A).

For this reason, the temperature compensating resistor 503 is preferably supported by the lead wire 304 having no less heat resistance than that of the lead wire 302 supporting the air velocity measuring resistor 501 in order to measure with high accuracy the volume of air drawn in under any running condition of the engine.

Accordingly, the lead wire 304 of the temperature compensating resistor 503 may be made longer and/or smaller in diameter than that of the air velocity measuring resistor 501.

Figure 9:
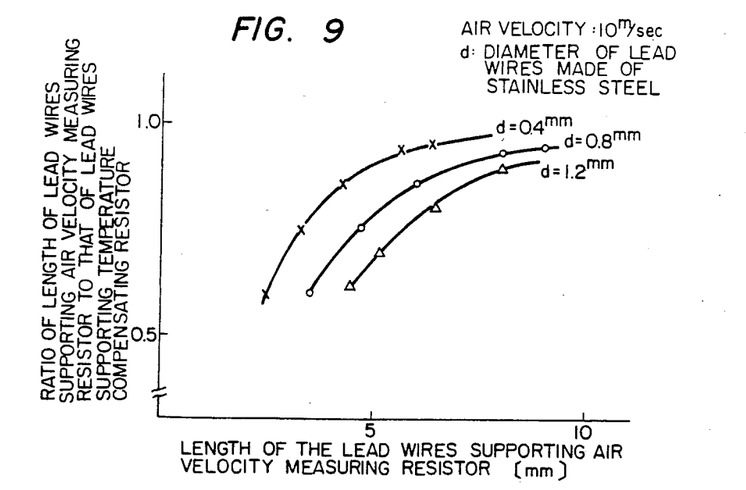
FIG. 9 is a diagram showing the relation between the length of the lead wires supporting the resistors.

FIG. 9 is a diagram showing the relation between the length of the lead wires 302 and 304 for which there is headly any influence due to the wall temperature on the output signal, when the wall temperature and the temperature of the air flowing through at a constant velocity of 10 m/sec are different, representing the diameter of the lead wires as a parameter.

The lead wires are made of the same material, such as stainless steel, and have the same diameter.

The absissa represents the length of the lead wires supporting the air velocity measuring resistor 501, and the ordinate represents the ratio of the length of the lead wires supporting the air velocity measuring resistor 501 to that of the lead wires supporting the temperature compensating resistor 503.

As is apparent from FIG. 9, in the case where both of the lead wires 302 supporting the air velocity measuring resistor 501 and the lead wires 304 supporting the temperature compensating resistor 503 are long, both of them are required to have the same length. To the contrary, in the case where both are short, the lead wires 304 supporting the temperature compensating resistor 503 are required to be made longer than those supporting the air velocity measuring resistor 501.

As the diameter of the lead wires 302 is made larger, the lead wires 304 supporting the temperature compensating resistor are required to be made longer than that supporting the air velocity measuring resistor, as shown in FIG. 9.

Figure 10A:
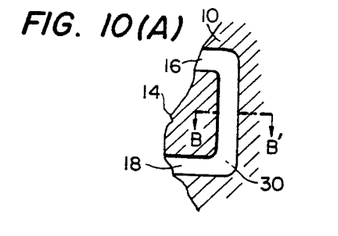
FIGS. 10(A)–10(B) are enlarged cross-sectional views showing the bypass passage in which the air flow meter of the invention is installed.
Figure 10B:
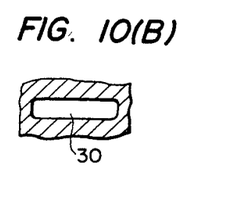

The bypass passage 30 of the invention has a rectangular cross section with a longer lateral side and has a curvature at the bends, as shown in FIGS. 10(A) and 10(B). In general, as the fluid flow through the main passage decreases, the amount of fluid passing through the bypass passage decreases at a rate greater than that of the main passage. Since the heat sensing wire type air flow meter detects the overall intake air volume from the amount of air passing through the bypass passage 30, the above configuration of the bypass passage 30 is effective in improving the proportional relationship between them. That is, since the cross section of the bypass passage 30 is rectangular, the air flow easily becomes laminar and its direction is smoothly changed by the curvature at the bends, so that the turbulence of air in the bypass passage is limited to the minimum. Therefore, a proportional relationship between the main intake air volume and the bypass air volume can be maintained even when the intake air flow decreases. The bypass passage 30 may have a circular cross section.

The bypass inlet 16 and outlet 18 of the bypass passage 30 are formed facing the intake passage 12 at right angles so that any dust carried in the main air flow can be prevented from entering the bypass passage 30. This keeps the resistor 501, 503 from being fouled and ensures long life. If the engine backfires and the air flow is reversed, the air will not enter the bypass outlet 18 and flow back through the bypass passage 30, since the bypass outlet 18 is formed at the narrowest portion of the venturi 14. In other words, the reverse air flow is separated from the air horn wall by the venturi 14, so that the pressure at the bypass inlet 16 becomes almost equal to that at the bypass outlet 18 and the air does not flow back through the bypass passage 30. Thus, no error will arise in the measurement of the intake air volume when the engine backfires and the air flows back. For the same reason, no measurement error will be generated by the pulsation of the intake air flow caused by the engine, so that the heat sensing wire type flow meter can provide signal which represents the correct air volume taken into the combustion chambers of the engine.

As can be seen from the foregoing, the air flow meter of this embodiment has a construction such that the resistors 501, 503 are supported on the lead wires 302, 304 of the same length in the bypass passage 30 which is enclosed by the cover 308 with smooth wall surfaces made of synthetic resin material of low thermal conductivity, the bypass passage 30 having a flat rectangular cross section and opening into the intake passage 12 at the venturi 14 as well as at a point upstream of the venturi 14; hence this flow meter can detect the mass of air flow passing through the bypass passage 30 with high accuracy even when the engine backfires and the air flows back. This construction also has an advantage of being able to provide an improved proportional relationship between the main intake air mass and the bypass air mass.

Figure 11:
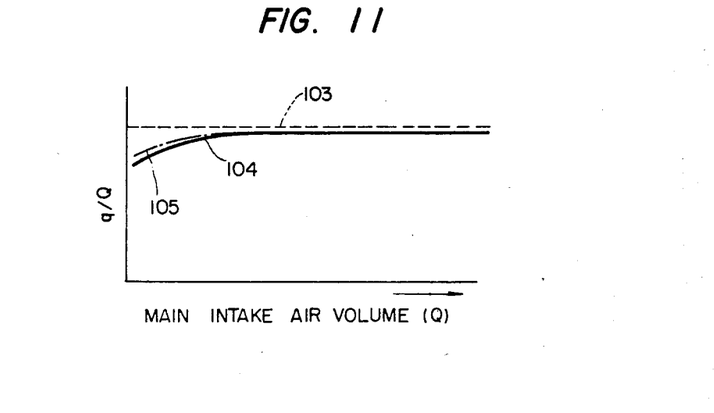
FIG. 11 is a diagram showing the relation between the main air volume through the intake passage and the bypass air volume through the bypass passage.

FIG. 11 is a diagram showing the relationship between the volume of air flowing through the intake passage 12 and the volume of air passing through the bypass passage 30, with the abscissa representing the main intake air volume Q and the ordinate representing the ratio q/Q of the bypass air volume q to the main intake air volume Q. The horizontal dashed line 103 represents the ideal relation in which the ratio q/Q is constant for any value of the main intake air volume Q. As a matter of fact, in the conventional bypass type flow meter the bypass air volume q rapidly decreases as the take intake volume Q becomes small, as indicated by the solid line 104. However, the reduction of the bypass air volume q is smaller for the flow meter of this invention than for the conventional one, as shown by the one-dot line 105, indicating that the present invention gives better proportionality between the two quantities.

Figure 12:
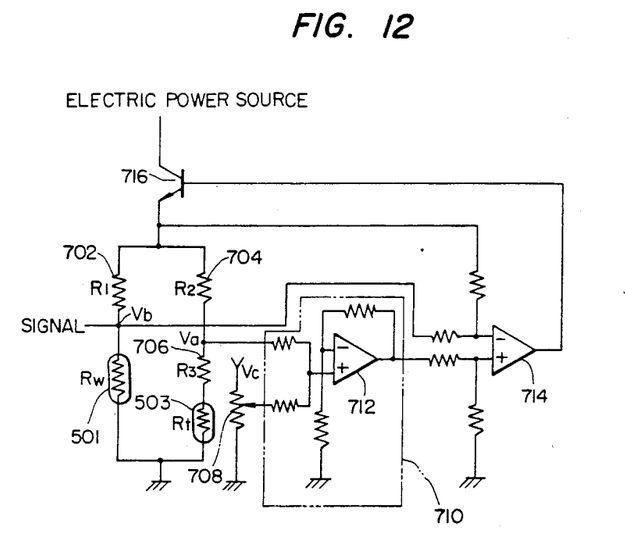
FIG. 12 is a circuit of an embodiment of the heat sensing wire type air flow meter constructed according to the invention.
Figure 13:
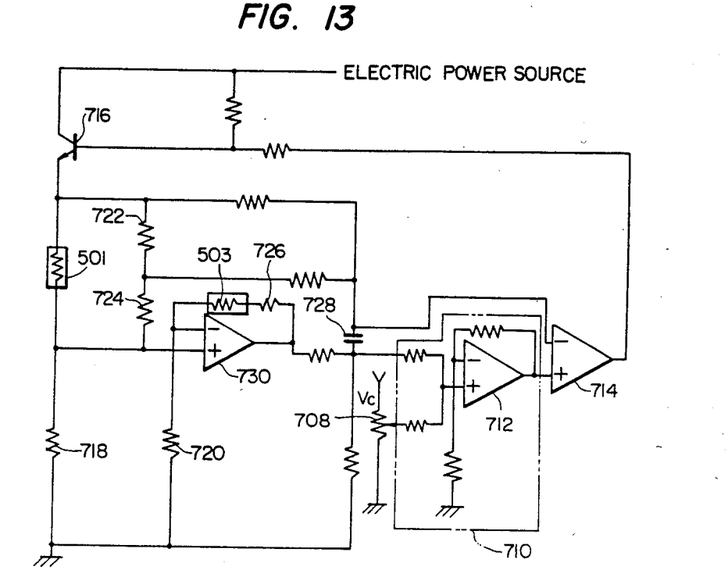
FIGS. 13 and 14 are circuits modified from that shown in FIG. 12.

FIG. 12 shows a circuit 70 for the heat sensing wire type air flow meter of this invention. The potential Va at a point between the resistors 704, 706 is added to a constant voltage of an adder 710. This constant voltage is set by a voltage divider 708. The potential Vb is the signal voltage of the air flow meter and is added to the negative terminal of a differential amplifier. Va and Vb are expressed as follows $$V_a = \frac{(R_1 + R_W) \cdot I \cdot (R_3 + R_t)}{(R_1 + R_W) + (R_2 + R_3 + R_t)} \quad (1)$$

$$V_b = \frac{(R_2 + R_3 + R_t) \cdot I \cdot R_W}{(R_1 + R_W) + (R_2 + R_3 + R_t)} \quad (2)$$

where $R_1$ = resistance of the resistor 702,
$R_2$ = resistance of the resistor 704,
$R_3$ = resistance of the resistor 706,
$R_t$ = resistance of the temperature compensating resistor 503, and V is a potential of the emitter of the transistor 716. Assuming Vc stands for a predetermined potential given by the variable resistor 708, and when the potential of the adder 710 is made equal to the potential $V_b$ the following equation holds in the circuit of FIG. 13.

$$V_b = V_a + V_c \quad (3)$$

From the equations (1), (2) and (3), the resistance Rw of the air velocity measuring resistor 501 can be expressed as $$R_W = \frac{R_1}{R_2} \cdot (R_t + R_3) + \frac{V_c}{IR_2} \cdot \quad (4)$$

$$\{(R_1 + R_W) + (R_2 + R_3 + R_t)\}$$

$$R_W = \frac{R_1(R_t + R_3) + \frac{V_c}{I}(R_1 + R_2 + R_3 + R_t)}{R_2 - \frac{V_c}{I}} \quad (4')$$

Since the emitter current I of the transistor 716 increases with increasing air volume, Rw, the amount of which corresponds to a temperature of the air velocity measuring resistor 501 becomes large in the low air flow range and small in the high air flow range as will be understood from equation (4'). Therefore, the amplitude of the signal from the heat sensing wire type air flow meter becomes comparatively large in the low air flow range and small in the high air flow range. As a result, the one-dot line 105 of FIG. 11 approaches the target dashed line 103 for which the ration q/Q is constant for all values of the main intake volume Q. In this way, the outputs in the low air flow range can be corrected.

FIG. 13 shows a circuit of the heat sensing wire type air flow meter modified from that shown in FIG. 12. Parts that are identical with those in FIG. 12 are given the same reference numerals. In this circuit, the temperature compensating resistor 503 is connected across an operational amplifier 730 so as to control the gain thereof and further to limit the amount of current flowing therethrough which causes self-heating thereof thereby improving the accuracy of air temperature compensation. Reference numerals 718, 720, 722, 724 and 726 represent fixed resistors which constitute elements of a modified bridge circuit, 730 an operational amplifier, 714 a differential amplifier, and 716 a transistor. The constant voltage Vc as set by the variable resistor 708 and the output voltage from the operational amplifiers 730 are applied to the positive input terminal of the adder 710 and the output voltage of the adder 710 is applied to the positive input terminal of the differential amplifier 714 to obtain the same effect as that given by the circuit of FIG. 12. A condenser 728 is provided to prevent noise.

Figure 14:
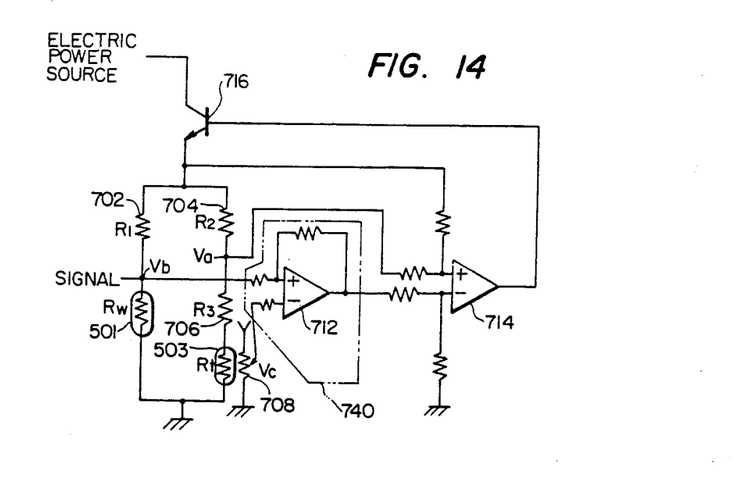

FIG. 14 shows a further modification of the circuit of FIG. 12, in which a subtracter 740 subtracts the constant voltage set by the variable resistor 708 from the potential between the resistor 702 and the air velocity measuring resistor 501 to make this voltage difference equal to the potential at a point between the resistors 704, 706.

It is then true that $$V_a = V_b - V_c \quad (5)$$

The above equation is equal to (3) and this means that the circuit shown in FIG. 14 provides the same effect as does the circuit of FIG. 12.

Figure 15:
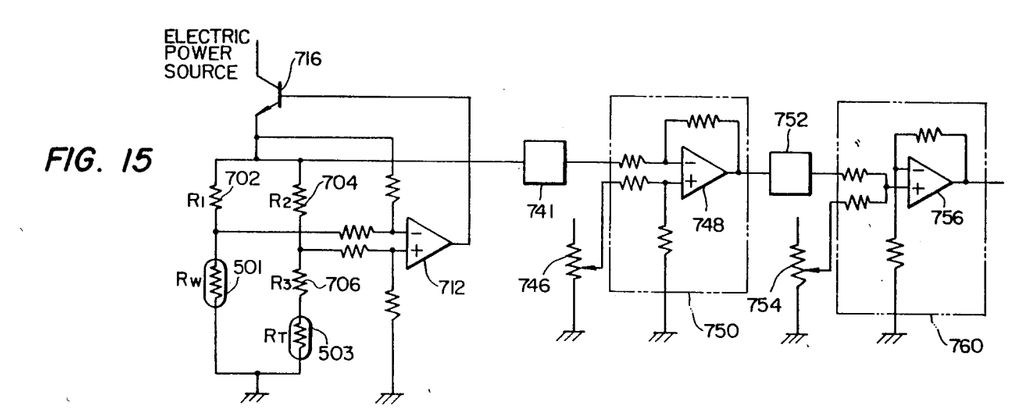
FIG. 15 is a circuit of still another embodiment of the air flow meter constructed according to the present invention.

FIG. 15 is still another modification of the circuit 70 of the heat sensing wire type air flow meter constructed according to this invention. If we let V stand for the signal from the heat sensing wire type air flow meter, the following relation holds between the amplitude of the signal V and the amount of air q flowing past the bypass passage 30.

$$V^2 = c1 + c2 \sqrt{q} \quad (6)$$

Therefore $$q = \left(\frac{V^2 - c1}{c2}\right)^2 \quad (7)$$

where c1 and c2 are constants relating to the heat sensing resistors. The circuit of this embodiment performs the arithmetic operation represented by the equation (7).

According to the present invention, a predetermined voltage potential is applied to one of the input terminals of the amplifier or the differential amplifier which is included in the closed-loop circuit which effects to balance the potentials at two intermediate points of the Wheatstone bridge so as to adjust or correct the output signal of the airflow meter when the intake air volume is small thereby enabling accurate measurement of the air flow.

Figure 16:
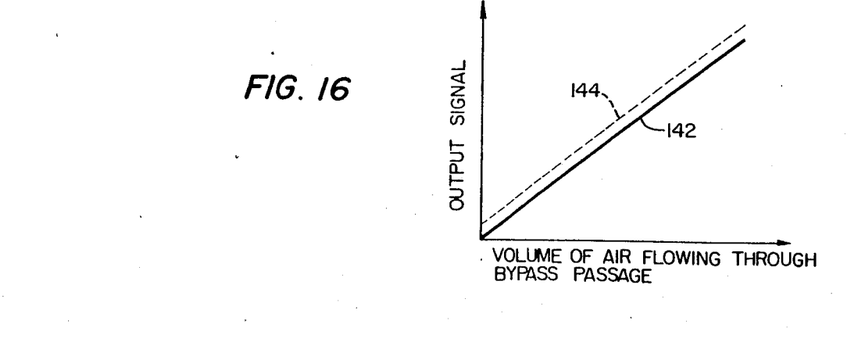
FIG. 16 is a diagram showing the relation between the volume of air flowing past the bypass passage and the output of the air flow meter.

FIG. 16 is a diagram showing the relation between the volume of air passing through the bypass passage and the output of the circuit of FIG. 15. The solid line 142 represents the output of the square-law detector 752 and the dashed line 144 the output of the adder 760. In this way, a certain value is added to the output of the square-law detector 752 so that the increase in output is comparatively small when a large amount of air is flowing through, and is large when only a small amount of air is passing through. As a result, the measurement errors caused in the low air volume area can be corrected. The amount of correction can be adjusted by the variable resistor 754.

As can be seen from the foregoing, the circuit of the heat sensing wire type air flow meter of this embodiment has an advantage that by adding a suitably adjusted voltage to the signal representing the volume of air flowing past the bypass passage, it is possible to correct the signal value when the volume of intake air is small.

According to the embodiment of the invention the ouput of the closed-loop control circuit which controls at the same value the potentials at two points between resistors on the parallel circuits of the Wheatstone bridge is added to a suitably adjusted voltage so as to adjust or correct the output when the intake air volume is small. This enables accurate measurement of the air flow.

With the air flow meter of this invention, it is possible to measure highly accurately the intake air volume over a wide range of engine running conditions for a long period of operation.

What we claim:
1. An air flow meter comprising:
    a bridge circuit including an air velocity measuring resistor and a temperature compensation resistor disposed in an air bypass passage formed parallel with an air intake passage for measuring an air velocity therein;

a switching transistor for controlling current flow to said bridge circuit;

a differential amplifier having two input terminals each of which are respectively coupled to two intermediate points of said bridge circuit, the voltage at one of the two intermediate points of said bridge circuit representing the air velocity signal, and an output terminal electrically coupled to said switching transistor so as to maintain the temperature of the air velocity measuring resistor at a predetermined amount;

an adjustable voltage source electrically coupled to one of the two input terminals of said differential amplifier for applying a predetermined D.C. voltage thereto so as to increase the predetermined temperature of the air velocity measuring resistor during a low air velocity for correcting the characteristic that the ratio of an air volume of the air bypass passage to an air volume of the air intake passage decreases during a low air velocity.

2. An air flow meter according to claim 1, wherein said bridge circuit further comprises an operational amplifier, one input terminal of the operational amplifier is electrically coupled to one of the two intermediate points of said bridge circuit representing the air velocity signal, and an output terminal of the operational amplifier is electrically coupled to one of the two input terminals of said differential amplifier, the temperature compensating resistor being connected across said operational amplifier so as to control a gain thereof.

3. An air flow meter comprising:

a bridge circuit including an air velocity measuring resistor and a temperature compensating resistor disposed in an air bypass passage formed parallel with an intake passage for measuring an air velocity therein, a first resistor connected in series with the air velocity measuring resistor and forming a first series circuit, and second and third resistors connected in series with each other and further connected in series with the temperature compensating resistor and forming a second series circuit together therewith, the first and second series circuits being connected in parallel;

a switching transistor for controlling current flow to said bridge circuit;

a differential amplifier having two input terminals respectively electrically coupled to a junction between the air velocity measuring resistor and the first resistor and to a junction between the second and third resistors, a voltage at the junction between the air velocity measuring resistor and the first resistor representing the air velocity signal, and an output terminal of the differential amplifier is electrically coupled to said switching transistor so as to maintain the temperature of the air velocity measuring resistor at a predetermined amount; and an adjustable voltage source electrically coupled to one of the two input terminals of said differential amplifier for applying a predetermined constant D.C. voltage thereto so as to increase the predetermined temperature of the air velocity measuring resistor during a low air velocity for correcting the characteristic that a ratio of an air volume of the air bypass passage to an air volume of the air intake passage decreases during a low air velocity.

4. An air flow meter comprising:

a bridge circuit including an air velocity measuring resistor and a temperature compensating resistor disposed in an air bypass passage formed parallel with an air intake passage for measuring an air velocity therein, a first resistor connected in series with the air velocity measuring resistor, second and third resistors connected in series with each other and connected in parallel with the air velocity measuring resistor, an operational amplifier having an input terminal connected to the junction between the air velocity measuring resistor and the first resistor, the temperature compensating resistor is connected between another input terminal of the operational amplifier and an output terminal thereof so as to control a gain thereof, and a fourth resistor connected between the other input terminal of the operational amplifier and the other terminal of the first resistor;

a switching transistor for controlling current flow to said bridge circuit;

a differential amplifier having two input terminals respectively electrically coupled to a junction between the air velocity measuring resistor and the first resistor through the operation of amplifier and to a junction between the second and third resistors, a voltage at the junction between the air velocity measuring resistor and the first resistor representing an air velocity signal, and an output terminal of the differential amplifier is electrically coupled to said switching transistor so as to maintain the temperature of the air velocity measuring resistor at a predetermined amount; and an adjustable voltage source electrically coupled to one of the two input terminals of said differential amplifier for applying a predetermined constant D.C. voltage thereto so as to increase the predetermined temperature of the air velocity measuring resistor during a low air velocity for correcting the characteristics that a ratio of an air volume of the air bypass passage to an air volume of the air intake passage decreases during the low air velocity.

* * * * *